United States Patent [19]

Lloyd et al.

[11] Patent Number: 4,624,890

[45] Date of Patent: Nov. 25, 1986

[54] ARTICLE SUITABLE FOR WIPING SURFACES

[75] Inventors: John Lloyd; George K. Rennie, both of Merseyside, England

[73] Assignee: Lever Brothers Company, New York, N.Y.

[21] Appl. No.: 793,068

[22] PCT Filed: Feb. 13, 1985

[86] PCT No.: PCT/GB85/00056

§ 371 Date: Oct. 15, 1985

§ 102(e) Date: Oct. 15, 1985

[87] PCT Pub. No.: WO85/03722

PCT Pub. Date: Aug. 29, 1985

[51] Int. Cl.[4] .............................................. B32B 27/00

[52] U.S. Cl. .................................... 428/290; 427/243; 427/389.9; 427/392; 428/248; 428/249; 428/274; 428/284; 428/289; 428/409; 428/913

[58] Field of Search ............... 428/284, 290, 298, 286, 428/913, 409, 289, 402; 15/104.93; 427/243, 389.9, 392

[56] References Cited

U.S. PATENT DOCUMENTS

| | | | |
|---|---|---|---|
| 2,741,568 | 4/1956 | Hayek | 117/139.5 |
| 2,808,349 | 10/1957 | Melamed | 117/139.5 |
| 3,694,364 | 9/1972 | Edwards et al. | 252/90 |
| 3,954,113 | 5/1976 | Bohrer et al. | 424/70 |
| 4,391,932 | 7/1983 | Tai | 523/337 |

FOREIGN PATENT DOCUMENTS

| | | |
|---|---|---|
| 3009585 | 8/1984 | Fed. Rep. of Germany . |
| 769732 | 3/1957 | United Kingdom . |
| 811030 | 3/1959 | United Kingdom . |
| 1409903 | 8/1972 | United Kingdom . |
| 1354406 | 5/1974 | United Kingdom . |

*Primary Examiner*—James J. Bell

*Attorney, Agent, or Firm*—Milton L. Honig; James J. Farrell

[57] ABSTRACT

A wiping cloth or similar article especially suitable for wiping glossy hard surfaces to give a streak-free result comprises a flexible absorbent substrate of fibrous material, having a base weight of at least 50 $g/m^2$ and a thickness of at least 0.5 mm, advantageously consisting at least partially of natural cellulosic fibres, treated with a cationic polyacrylamide to enhance its soil capture capability, and carrying a fully formulated liquid cleaning composition.

21 Claims, No Drawings

ARTICLE SUITABLE FOR WIPING SURFACES

The present invention relates to an article suitable for wiping surfaces, for example the surface of a household or industrial object, in order to remove soil or other unwanted matter from that surface. The article includes a substrate, conveniently in the form of a flexible sheet of fibrous material, which in a preferred embodiment of the invention carries an active material, for example a detergent or disinfectant composition, that is delivered to the surface during wiping.

The invention applies especially, but not exclusively, to wiping cloths and the like which carry a relatively large quantity of a cleaning material, for example, detergent or disinfectant, in such a form that its release can be controlled over a relatively long period. Such wipes have a much greater cleaning or disinfecting capacity than do simple impregnated tissues and accordingly need a correspondingly larger capacity for taking up soil or other unwanted matter. If the capture of soil is inadequate, the useful life of the wiping article will be limited by that before the supply of cleaning material is exhausted.

Wiping articles and the like which incorporate controlled release of active material have been described, for example, in GB No. 1 522 759 (Airwick); EP 66 463A (Unilever); EP No. 68 830A (Unilever); GB No. 1 326 080 (Freudenberg); and GB No. 1 304 375 (L'Oreal). The active material (liquid or solid but usually liquid) is generally encapsulated or compartmented in some way and can be released only by the application of some stimulus, for example, squeezing, rubbing or wetting.

U.S. Pat. No. 3,954,113 (Bohrer et al/Colgate-Palmolive) describes a simple wet impregnated cloth for cleaning the hair between shampoos. The cloth is pretreated with a cationic polyelectrolyte such as polyethyleneimine, in order to render it electrically attractive to hair soil.

U.S. Pat. No. 3,694,364 (Edwards/Procter & Gamble) describes a wash adjunct in the form of a porous pouch containing detergent, the pouch being treated with a stearoylated organic polyamine, for example, stearoylated polyethyleneimine, in order to impart to it dirt-trapping characteristics.

The present invention is based on the observation that, in articles for wiping surfaces based on a substrate of fibrous material, dirt capture during wiping is substantially enhanced by the presence on the fibres of the substrate of cationic polyacrylamides. This is especially valuable in conjunction with the controlled release of cleaning material as described previously, because it gives the article a prolonged dirt-capture capability to match its prolonged active release capability.

The present invention accordingly provides an article suitable for wiping surfaces, the article comprising an absorbent flexible substrate of fibrous material carrying as a dirt-capture agent a cationic polyacrylamide. The dirt-capture agent is preferably a water-soluble copolymer comprising at least 50 mole % of acrylamide units and up to 50 mole % of units of an aminoalkyl ester of acrylic or methacrylic acid which is wholly or partially quaternised.

The absorbent flexible substrate may advantageously consist at least partially of natural cellulosic fibres, such as wood pulp or cotton linters. The term "natural cellulosic fibres" does not include regenerated cellulosic fibres such as viscose (rayon). The substrate may if desired consist wholly or predominantly of natural cellulosic fibres. Other preferred properties of the substrate are discussed below.

The preferred group of cationic polymeric materials that has been found to give substantially improved dirt-capture in accordance with the invention is thus constituted by high-molecular weight copolymers of acrylamide with unsaturated amines which are wholly or partially quaternised. In the copolymer, the acrylamide units predominate and preferably constitute 80–97 mole % of the polymer. The comonomer is an aminoalkyl ester of acrylic or methacrylic acid, in which the amino group may be substituted by one or two alkyl, alkenyl, aryl, aralkyl or other suitable groups, or by substituents which together with the nitrogen atom form a heterocyclic ring. The molecular weight is preferably of the order of 5 to 20 million.

The units derived from the comonomer are advantageously of the formula I:

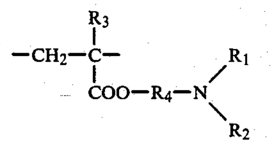

(I)

wherein $R_1$ and $R_2$, which may be the same or different, are hydrogen or alkyl, or together with the nitrogen atom to which they are attached form a heterocyclic ring; $R_4$ is alkylene containing 1 to 8 carbon atoms; and $R_3$ is methyl or hydrogen. Preferably $R_3$ is hydrogen, $R_1$ and $R_2$ are methyl or ethyl and $R_4$ is ethylene, that is to say, the units are derived from dimethylaminoethyl acrylate or diethylaminoethyl acrylate.

The acrylamide units which constitute the major part of the polymer of course have the formula II:

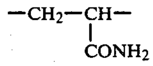

(II)

As indicated previously, the copolymer is at least partially in the form of a quaternary ammonium salt, that is to say, at least some of the units of the formula I will be in the form shown in the general formula I':

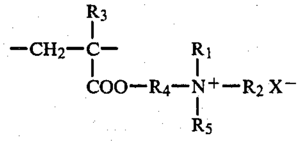

(I')

wherein $R_5$ is an alkyl group, preferably methyl, and $X^-$ is a monovalent anion or 1/m of an m-valent anion. Quaternisation may, for example, be effected by means of dimethyl sulphate or methyl chloride, and the counteranion will then be $CH_3SO_4^-$ or $Cl^-$ respectively.

It has been found that dirt capture is most efficient when the degree of quaternisation is relatively low, especially from 3 to 50 mole %, more especially from 5 to 30% mole.

An example of a class of materials preferred for use in the present invention is constituted by the Zetag (Trade Mark) series of polymers manufactured by Allied Colloids Ltd. The following Zetag grades have been found to be highly effective: Zetag 32 (low degree of quaternisation); Zetags 43, 63, 92 (low to medium degree of quaternisation); Zetag 75 (medium degree of quaternisation, 35–65 mole %); Zetags 57 and 87 (high degree of quaternisation). The low to medium quaternised grades Zetag 63 and Zetag 43 appear to be especially good.

Other cationic polyacrylamides include Separan (Trade Mark) XZ86243, XZ86242, XZ86241, XD8492.01, XD8493.01 and XD8494 ex Dow Chemical Co.; Crosfloc (Trace Mark) CFC301, CFC305, CFC306, CFC307, CFC315, CFC316, CC15, CC20, CC30, CC40, CC50, CC70 and CC100 ex J Crosfield & Sons; Superfloc (Trade Mark) C435, C436, C110 and C110 ex Cyanamid, International Division of American Cyanamid Co.; and Percol (Trade Mark) CA140, 292, SA and 263 ex Allied Colloids Ltd.

The article of the invention is in the form of a substrate treated with the dirt-capture agent characteristic of the invention and preferably also carrying a cleaning composition that will be delivered during wiping to the surface being wiped. Unlike the cleaning composition, the dirt-capture agent is not delivered to the surface being wiped but remains bound to the substrate material throughout the life of the article so that it can continue to attract and retain soil even when the cleaning composition is nearing exhaustion. Thus the dirt-capture agent is substantive to the material of the substrate.

Advantageously all the dirt-capture agent present in the article of the invention is bound substantively to fibres of the substrate, any excess being removed if necessary by washing: if additional dirt-capture agent is present, it can be deposited on the surface being wiped and flocculate soil there. In a preferred procedure, the substrate is impregnated with a solution of the dirt-capture agent, allowed to dry, washing thoroughly with demineralised water or with cleaning composition and if necessary dried again. An aqueous solution of the dirt-capture agent would generally be used for preference, but solvent systems might be used in certain circumstances.

In an especially preferred procedure, the substrate may be impregnated with a dilute aqueous solution (about from 0.1 to 0.5% by weight) of the polymer at a level such that a polymer solution loading of about 1 to 12 g per g of substrate is obtained, then dried and washed as described above.

The substrate may take any convenient form, but should be absorbent and desirably has a certain degree of flexibility so that it can conform to the surface during wiping. It may, for example, be a sponge or pad, or, most preferably, a flat flexible sheet of paper or woven, knitted or nonwoven fabric, which may consist of one or more layers.

In order to obtain a worthwhile improvement in soil capture capacity by use of the dirt-capture agent of the invention, it is necessary that the substrate itself, before treatment with the dirt-capture agent, should have at least a moderate dirt-capture capability. Thus in the case of a sheet material (single layer, or multi-layer laminate), a 30 cm×30 cm sample impregnated to a level of 1.5 g/g of substrate with the non-streak cleaning composition given below should be capable of cleaning to a streak-free finish at least 1 $m^2$ of glass soiled to a level of 80–120 mg (solids) with the model soil given below. The model soil is intended to simulate a typical airborne soil in a kitchen environment.

| | % |
|---|---|
| Non-streak cleaning composition (surface tension 38 $mNm^{-1}$): | |
| Nonionic surfactant (tallow alcohol 18 EO) | 0.1 |
| Isopropanol | 10.0 |
| Demineralised water to | 100.0 |
| Model soil | |
| Glycerol tripalmitate | 1.0 |
| Glycerol trioleate | 0.5 |
| Kaolin | 0.5 |
| Palmitic acid | 0.2 |
| Paraffin oil | 0.2 |
| Carbon black | 0.005 |
| 1,1,1-trichloroethane solvent to | 100 |

The substrate material, if not inherently streak-free, may be prewashed either with demineralised water or with the cleaning composition with which it is to be loaded, before treatment with the cationic polymeric dirt-capture agent.

Table 1 shows some sheet substrate materials suitable for use in the invention, while Table 2 shows some unsuitable materials. The area of glass that could be cleaned with some of these materials using the test given above was as follows:

| | Area ($m^2$) |
|---|---|
| Hi-Loft* 3051 | 2 |
| Storalene* 610-60 | 1.5 |
| Mitsubishi* TCF 404 | approx. 0 |

*denotes Trademark

TABLE 1

| Trade Name (*denotes Trademark Manufacturer | Fibre Mix | Fabric type | |
|---|---|---|---|
| Hi-Loft* 3051 & 3037 | Scott Paper Co. (USA) | Wood pulp, with ethylene-vinyl acetate copolymer binder | Random wet-laid high bulk paper creped on one side |
| Honshu* P60 | Honshu Paper Co. (Japan) | Wood pulp, with acrylic or styrene-butadiene copolymer binder | Dry-formed high bulk paper with a viscose fibre facing on each surface |
| Airtex* SC150, SC150HB, SC150HBLT | Fort Howard Paper Co (USA) | Wood pulp | Dry-formed high bulk paper |
| Storalene* 610-60 | Stora-Kopparberg (Sweden) | 55% viscose, 40% cotton linters, 5% polyamide, with acrylic binder | Wet-laid nonwoven fabric having a random fibre arrangement |
| XLA 150 | Bonded Fibre Fabrics Ltd (UK) | polyester/viscose, with acrylic binder | Very low density dry laid nonwoven fabric having a random structure |
| Vilene* 384 | Bondina (UK) | 80% polyester, 20% viscose | very low density dry laid nonwoven fabric having a random |

TABLE 1-continued

| Trade Name (*denotes Trademark Manufacturer | Fibre Mix | Fabric type | |
|---|---|---|---|
| | | | structure |
| Sontara* 8412 | Du Pont (USA) | 70% viscose, 30% polyester | Spun-laced apertured nonwoven fabric |

TABLE 2

| Trade Name (*denotes Trademark) | Manufacturer | Fibre Mix | Fabric type |
|---|---|---|---|
| Tamlon* 286 | Tampella (Finland) | 80% viscose, 20% wood pulp, with acrylic binder | Wet-laid nonwoven fabric lightly apertured to give mesh pattern |
| Gessner* Duftex* 04 | Gessner GmbH (Germany) | Softwood pulp | Creped wet-laid paper of high wet strength |
| Mitsubishi* TCF 404 | Mitsubishi (Japan) | Viscose | Nonwoven fabric |

The substrate material may also be defined in terms of preferred physical properties, as follows:

(a) At zero applied pressure

Base weight: at least 50 g/m$^2$, preferably at least 60 g/m$^2$.

Thickness: at least 0.5 mm, preferably at least 0.7 mm.

Void volume: at least 90%.

Absorbent capacity for water: at least 6.0 g/g.

(b) At a typical applied wiping pressure of 23 kN/m$^2$

Extent of compression: at least 50%.

Contact area: at least 28%.

Compressed void volume: at least 80%.

Compressed thickness: at least 0.2 mm.

The relevance of these parameters to soil capture capability was demonstrated in an experiment the results of which are summarised in Tables 3 and 4, in which the parameters themselves aare also given. In the experiment, the percentage removal of radioactively ($C^{14}$) labelled glycerol trioleate soil from glass was measured.

TABLE 3

| | Properties at zero applied pressure | | | | |
|---|---|---|---|---|---|
| Substrate | Base weight (g/m$^2$) | Thickness (mm) | Void volume (%) | Absorbent capacity (g/g) | % soil removal |
| HiLoft 3051 | 85 | 0.73 | 92 | 6.5 | 59 |
| HiLoft 3037 | 70 | 0.49 | 91 | 6.2 | 55 |
| Honshu P60 | 60 | 0.98 | 96 | 15.6 | 63 |
| Airtex SC150 | 90 | 0.84 | 93 | 8.2 | 52 |
| Airtex SC150HB | 87 | 1.01 | 94 | 10.0 | 48 |
| Airtex SC150HBLT | 84 | 1.16 | 95 | 12.4 | 51 |
| XLA 150 | 175 | 3.76 | 97 | 24.3 | not measured |
| Vilene 384 | 174 | 3.09 | 96 | 21.3 | not measured |
| Storalene 610:60 | 60 | 0.57 | 93 | 9.3 | 52 |
| Tamlon 286 | 50 | 0.33 | 89 | 6.0 | 27 |
| Gessner Duftex 04 | 50 | 0.15 | 81 | 2.7-3 | 19 |

TABLE 4

| | Properties at 23 kN/m$^2$ applied pressure | | | | |
|---|---|---|---|---|---|
| Substrate | Extent of compression (%) | Contact area (%) | Compressed void volume (%) | Compressed thickness (%) | % soil removal |
| HiLoft 3051 | 60 | 42 | 81 | 0.29 | 59 |
| Honshu P60 | 79 | 28 | 82 | 0.21 | 63 |
| Tamlon 286 | 47 | 26 | 79 | 0.17 | 27 |
| Gessner Duftex 04 | 33 | 8 | 68 | 0.10 | 19 |

Of the materials investigated, Hi-Loft (Trade Mark) 3051 and Honshu (Trade Mark) P.60 gave the best results. Both these are materials of relatively low density and high void volume, that is to say, the volume occupied by voids is very much larger than that occupied by fibres. The porosity is defined as follows:

$$\text{Porosity} = \frac{\text{void volume}}{\text{total volume}} \times 100$$

It appears in general that materials having porosities of at least 80%, preferably from 80 to 99%, are preferred and those having porosities within the range of from 85 to 95% are especially preferred. Such high porosities may be achieved both by random arrangements of fibres, as in lofty (advantageously creped) paper and nonwoven fabrics, and also by means of distinct regions of high and low densities. Both types of structure can be used to advantage in the present invention, and Table 1 shows that suitable materials may be made by both wet-laid and dry-laid processes.

Advantageously, as described in GB No. 2 125 277A (Unilever), the substrate may comprise a bulky high-porosity sheet material as previously indicated, having on one or both surfaces flattened areas including thermoplastic fibres coalesced by the application of heat and pressure to such an extent as substantially to lose their fibrous identity. These thermoplastic fibres may be derived from a separate layer of lightweight thermoplastic coverstock fusion-bonded onto the bulky material. Alternatively, if the bulky material itself contains sufficient thermoplastic fibres, this surface structure may be derived from a heat and pressure treatment of the bulky material without the use of a separate covering layer.

Where a separate covering layer is used, this advantageously has a base weight of from 8 to 25 g/m$^2$, preferably from 10 to 20 g/m$^2$. It must of cource be of relatively open structure so that access to the adjacent bulky layer by liquid or soil is not restricted. Suitable materials include the well-known coverstocks for diapers and sanitary towels. Examples of these include Novelin (Trade Mark) S 15 and US 15, manufactured by Suominen (Finland), which are dry-laid nonwoven fabrics derived from a polypropylene/viscose fibre mix and have base weights of about 15 g/m$^2$. Other suitable materials include: Bondina LS 5010, manufactured by Bondina Ltd (UK), which is derived from polypropylene fibres and has a base weight of about 10 g/m$^2$; and Paratherm PS 315 (Lohmann), which is derived from 50% viscose/50% polypropylene fibres and has a base weight of 16 g/m$^2$.

An example of a bulky material that can be heat- and pressure treated as described above without an additional covering layer is XLA 150, which is shown in Table 1; its porosity is 97%.

It has been found that a heat- and pressure surface treatment as described above gives improved performance in the streak-free cleaning of glossy hard surfaces. It can also alleviate the problem of linting, that is, the deposition of fibre fragments on a wiped surface, that occurs with some bulky materials. The presence of an outer surface layer is especially beneficial in this latter context.

The simplest embodiment of the invention is a dry substrate, treated with the dirt-capture agent of the invention, which can be moistened, or dipped into any suitable and compatible cleaning composition, by the consumer at the point of use. Cleaning compositions containing anionic surfactants should, however, be avoided because they will interact with, the deactivate, the cationic dirt-capture agent. Likewise cleaning compositions containing solids should be avoided because the solids could exhaust the soil capture capacity of the cationic polymer.

The avoid the problem of choosing a compatible cleaning agent, the substrate may be impregnated or coated with its own cleaning agent ih dry form so that it need only be wetted with water before use. Examples of such cleaning agents include detergents, disinfectants and polishes. It is possible, however, that contamination will be introduced by the wetting procedure so that the dirt-capture capacity of the article will be reduced before it is even applied to the surface to be wiped.

This further problem can be eliminated if the article of the invention carries a fully formulated cleaning composition in liquid form which requires no further addition of liquid before use. In this embodiment, the liquid cleaning composition itself is preferably used to wash out excess dirt-capture agent from the substrate.

In one preferred embodiment, the article of the invention includes a liquid cleaning composition which on glossy hard surfaces gives a substantially streak-free result. In this embodiment, the cleaning composition is a homogeneous aqueous liquid having a surface tension of less than 45 $mNm^{-1}$, preferably less than 35 $mNm^{-1}$, which, when applied to a surface and allowed to dry, dries substantially without forming discrete droplets or particles larger than 0.25 $\mu m$. Numerous examples of such compositions are disclosed in EP 67 016A (Unilever).

The formation of discrete droplets or particles larger than 0.25 $\mu m$ on drying causes scattering of visible light (wavelength 0.4–0.7 $\mu m$), which is perceived by the eye as streaking. Preferably the liquid composition dries substantially without forming discrete droplets or particles larger than 0.1 $\mu m$.

The lowering of surface tension (the value for pure water at ambient temperature is above 70 $mNm^{-1}$) is conveniently achieved by the inclusion in the liquid composition of a surface-active agent, preferably at a concentration not exceeding 1.5% by weight, more preferably at a concentration within the range of from 0.009 to 1% by weight, especially from 0.02 to 0.2% by weight. Nonionic surface-active agents are preferred, and one glass of such surfactants that give good streak-free results is comprised by the condensation products of $C_{16}$–$C_{20}$ alcohols, especially straight-chain primary alcohols, with 15 to 30 moles of ethylene oxide. An example is the condensation product of tallow alcohol with 18 moles of ethylene oxide.

The liquid composition may contain, as well as water, at least one water-miscible solvent, preferably a lower aliphatic alcohol such as ethanol or isopropanol.

The non-streak composition given above in the test for suitable substrate materials constitutes a preferred example of a liquid cleaning composition for use in the article of the invention.

Liquid-carrying embodiments of the article of the invention may simply be impregnated with the cleaning composition. The amount of liquid that can be carried, and the degree of control over its release, will depend on the substrate characteristics. A single sheet of substrate, for example, wet-strength paper or nonwoven fabric, will have limited liquid-carrying capacity and will tend to become exhausted relatively quickly in use; improved characteristics may be obtained by laminating two or more such sheets together. A further improvement may be achieved by sandwiching a layer of highly absorbent material, for example, plastics foam, sponge or wood pulp fluff, between two sheet substrate layers. These various structures are, of course, also advantageous in dry embodiments of the invention which are to be wetted by the user.

Highly efficient controlled release of large volumes of liquid can be achieved by carrying the liquid in a highly porous polymer, as disclosed in EP 68 830A and GB No. 2 142 225A (Unilever). Such a polymer is capable of retaining at least 5 ml of liquid per g of polymer and releasing it on the application of hand pressure. Preferred polymers are homo- and copolymers of styrene and their chemically modified, especially sulphonated, counterparts, and these polymers, are preferably prepared by polymerisation of a high internal phase emulsion, as described in the above-mentioned Unilever specifications. Some of these polymers, notably the sulphonated variants, are capable of absorbing aqueous liquids spontaneously and are also useful in dry embodiments of the present invention. The polymer, in sheet or powder form, may conveniently be sandwiched between two or more layers of sheet substrate material.

In yet another embodiment, the article of the invention may carry a liquid cleaning composition in pressure-rupturable microcapsules, as disclosed in GB No. 1 326 080 (Freudenberg), the microcapsules being carried in, on or between one more substrate layers. This embodiment may be dry to the touch, or impregnated with further liquid, as desired.

The invention is further illustrated by the following non-limiting Examples, in which parts and percentages are by weight unless otherwise stated.

EXAMPLE 1

Two sets of substrates (A and B) were prepared. Each substrate consisted of a single 30 cm×30 cm layer of Hi-Loft (Trade Mark) 3051 lofty low-density wet-strength paper (base weight 85 g/m$^2$, porosity 92%, ex Scott Paper Co.), covered on each side with a layer of Novelin (Trade Mark) US 15 dry-laid polypropylene/-viscose nonwoven fabric (base weight 15 g/m$^2$, ex Suominen) fashion-bonded thereto by the application of heat and pressure (heated rollers) such that some fibres at the outer surface had substantially lost their fibrous identity and had coalesced to form flat regions. The outer surfaces of the composite substrates thus formed felt smooth to the touch and were glossy in appearance.

The substrates were then washed to remove streak-forming impurities, as described in EP 67 016A (Unilever). The washing was carried out in a solution of nonionic detergent in demineralised water using a Whirlpool (Trade Mark) washing machine at about 40° C.; the substrates were then rinsed in dermineralised water, spin-dried and tumble-dried.

The substrates of the first set (A) were pretreated with a dirt-capture agent according to the invention. They were each treated with a 0.1% by weight solution, in demineralised water, of the cationic acrylamide copolymer Zetag (Trade Mark) 63 mentioned previously, at a level of approximately 2 g solution (2 mg polymer) per g substrate, and then dried at 50° C. The polymer-treated substrates were then washed in a large excess of the streak-free cleaning composition given previously to remove any fugitive polymer.

The substrates of the control set B were untreated.

Both sets of substrates were then impregnated with the streak-free cleaning composition to a level of about 1.5 g per g substrate, to form wet wiping cloths for glossy hard surfaces.

The streak-free performances of the two sets of wiping cloths were compared using the following test. A clean 1 m$^2$ area of glass was sprayed, using a Humbrol spray gun, with the model soil given previously. The soil was sprayed on in an amount of approximately 100 mg (all components except the solvent), the exact delivery of soil being determined by differential weighing of the reservoir of the spray gun.

The wiping cloths prepared as described above were then used to clean the surface to give as streak-free as possible an end result, the cleaning performance being assessed visually by a trained operator. The amount of cleaning liquid that had been delivered by the wiping cloth to the window was determined by weighing, then this liquid was replaced by more to restore the loading to 1.5 g/g. The window was then soiled again and the whole process was repeated over a number of soil-clean cycles until product failure from excessive streaking was observed. During the test the the operator's comment on the ease of use were recorded. The results were as follows:

| Cycle | Wt of Liquid used (g) | Soil level (g/m$^2$ of glass) | Result |
|---|---|---|---|
| | Set A (with polymer) | | |
| 1 | 2.04 | 0.09 | No streaking-one wiping stroke only needed |
| 2 | 1.99 | 0.08 | No streaking-one wiping stroke only needed |
| 3 | 2.34 | 0.09 | No streaking-one wiping stroke only needed |
| 4 | 2.70 | 0.08 | No streaking-one wiping stroke only needed |
| 5 | 2.06 | 0.08 | Very slight streaking |
| 6 | 2.58 | 0.08 | slight streaking |
| | Set B (without polymer) | | |
| 1 | 2.48 | 0.11 | No streaks-easy to use |
| 2 | 3.00 | 0.10 | No streaks-easy to use |
| 3 | 3.06 | 0.09 | Very slight streaking |
| 4 | 2.05 | 0.10 | Streaking |
| 5 | — | 0.10 | Bad streaking |

It will be seen that when the Zetag 63 polymer was present, non-streak performance was maintained for four soil-clean cycles and even in the sixth cycle only slight streaking was observed. When no polymer was present, non-streak performance was maintained only for two cycles.

EXAMPLE 2

The effect of various cationic polyacrylamides on the total area of glass cleaned with a 30 cm×30 cm sample of the Hi-Loft/Novelin S.15 substrate used in Example 1 was investigated. The preparation of the substrates, the cleaning composition and its loading used, and the soil and its level, were as in Example 1. For each polymer, a sample from which excess polymer had been washed out was compared with one in which it had not. The results, which follow, show that most Zetag grades can at least double the area cleaned to a streak-free finish. Washing out excess polymer had, in general, little effect, although it might do if the polymer were originally applied to a higher loading.

| Cationic polyacrylamide | Area of glass cleaned (m$^2$) with excess polymer washed out | without washing out excess polymer |
|---|---|---|
| None (control) | 2 | |
| Zetag 32 | 4 | 5 |
| 43 | 5 | 5 |
| 57 | 4 | 4 |
| 63 | 5 | 5 |
| 75 | 4 | 4 |
| 87 | 3 | 3 |
| 92 | 3 | 4 |

EXAMPLE 3

The procedure of Example 2 was repeated using a different substrate, Storalene 610:60, and the polymer Zetag 63. The results were as follows:

| | Area cleaned (m$^2$) |
|---|---|
| No polymer (control) | 1.5 |
| With excess polymer washed out | 2 |
| Without washing out excess polymer | 2.5 |

With this intrinsically less effective substrate, better results were obtained when excess polymer was not washed out.

COMPARATIVE EXAMPLE 1

The procedure of Example 2 was repeated using a substrate, Mitsubishi TCF 404, having a poor intrinsic soil capture capability. The results were as follows:

| | Area cleaned ($m^2$) |
|---|---|
| No polymer (control) | about 0 |
| Without washing out excess polymer | 0 to <1 |

Thus even with this poor substrate some small improvement was observed, but this did not bring the overall performance up to an acceptable level.

COMPARATIVE EXAMPLE 2

Instead of the cationic polyacrylamides used in Examples 1 to 3, a polyethyleneimine as disclosed in U.S. Pat. No. 3,954,113 (Colgate) was used to treat substrates as described in Example 1 and its effect on the area of glass cleaned, as in Example 2, was determined. The substrates impregnated with polyethyleneimine to a level of 2 mg/g and then washed to remove excess were capable of cleaning approximately 1 $m^2$ of soiled glass, as compared with untreated substrates which were capable of cleaning 2 $m^2$ of soiled glass. If the step of washing out excess polyethyleneimine was omitted, the substrates were capable of cleaning 1.5 $m^2$ of glass, but this was still inferior to the performance of the untreated substrates. The trained operator carrying out the test noted that the polyethyleneimine-treated substrates were more difficult to use than the untreated ones because they dragged on the glass: the soil also tended to aggregate on the glass.

This example demonstrates that not all cationic polyelectrolytes improve soil capture, and that the particular one disclosed in U.S. Pat. No. 3,954,113 (Colgate) actually has a detrimental effect.

EXAMPLE 4

This Example illustrates the use of a dirt-capture agent according to the invention in wiping cloths in accordance with EP No. 68 830A (Unilever) that incorporated controlled release of a streak-free cleaning composition from a highly porous polymer.

A highly porous polystyrene in accordance with EP 60 138A (Unilever) was prepared in the form of thin sheets each 20 cm×20 cm×0.15 cm. Each sheet was prepared from a high-internal-phase emulsion containing the following ingredients:

| | |
|---|---|
| Styrene | 30 ml |
| Divinyl benzene* (crosslinking agent) | 3 ml |
| Sorbitan monooleate (emulsifier) | 6 g |
| Distilled water containing 1.8 g sodium persulphate (initiator) | 900 ml |

*containing 50% ethyl vinyl benzene as impurity

The emulsion was prepared by stirring together the ingredients at 300 rev/min. The polymerisation was carried out as follows. Two glass plates were rendered superficially hydrophobic, and a 0.15 cm thick strip of neoprene rubber was stuck around the edge of one plate to define a square cavity 20 cm×20 cm. The cavity was filled with the emulsion, the second plate placed upon the first, and the two plates clipped together. The assembly was placed in a water bath at 50° C. for 24 hours. The polymerised material could then easily be removed as a sheet, which was then cut into 1 cm×1 cm squares using a scalpel and straight-edge.

The squares were Soxhlet extracted with methanol for 6 hours, dried in an oven at 30° C., and evacuated in a suitable vessel for 30 minutes. The vessel was isolated, the pump turned off, and the streak-free composition given in Example 1 was sucked in. This vacuum filling process was repeated after 15 minutes; it took about 1 hour for the squares of polymer to become filled. The filled polymer squares, containing more than 95% liquid, felt only slightly damp to the touch; liquid did not run out under gravity but could be expelled by pressing or squeezing.

Sheet substrates (21 cm×21 cm) were prepared, which consisting of a layer of Hi-Loft (Trade Mark) 3051 lofty low-density wet-strength paper as used in Example 1, having on one side a polyethylene coating and on the other a layer of Novelin (Trade Mark) US 15 dry-laid polypropylene-viscose nonwoven fabric fusion bonded thereto, using heat and pressure as described in Example 1. The polyethylene coating was pinholed at intervals so that the whole assembly would be permeable to liquids.

A first group of substrates (Set C) were pretreated, according to the invention, with a dirt-capture agent. These substrates were treated with a 0.1% by weight solution, in demineralised water, of the cationic acrylamide copolymer Zetag (Trade Mark) 63 mentioned previously, at a level of approximately 2 g solution (2 mg polymer) per g substrate, dried at 50° C., and washed with a large excess of the streak-free cleaning composition of Example 1 to remove fugitive dirt-capture polymer. A second, comparison, group of substrates (Set D) were untreated.

The liquid-carrying porous polymer squares and the substrates were combined to form controlled-release wiping cloths for glossy hard surfaces, as follows. One sheet substrate was positioned with its polyethylene-coated side uppermost, the squares were arranged on the substrate in a regular pattern of rows using a mask, and a second substrate was placed on the array of squares with its polyethylene-coated side downwards. The two substrate layers were heat-sealed together in a grid pattern along lines 1.3 cm apart running between the rows of squares in two mutually perpendicular directions, to give a compartmentalised structure in which each square of polymer was located in a separate square 1.3 cm×1.3 cm compartment. One or both of the substrates had previously been pinholed to allow release of the liquid at the point of use. Each cloth contained, in the porous polymer squares, about 50 g of streak-free cleaning composition, and after assembly was additionally moistened with the same composition to a level of 1.3 g/g substrate.

The streak-free cleaning performances of the two sets of wiping cloths, one with dirt-capture agent and one without, were compared by means of the test described in Example 1.

The results were as follows:

| Cycle | Wt of Liquid Used (g) | Soil level (g/$m^2$ glass) | Result |
|---|---|---|---|
| | | Set C (with dirt-capture agent): | |
| 1 | 1.88 | 0.101 | Good, easy to obtain streak-free finish |
| 2 | 2.39 | 0.143 | Good, easy to obtain streak-free finish |
| 3 | 2.19 | 0.143 | Good, easy to obtain streak-free finish |
| 4 | 2.09 | 0.099 | Good, easy to obtain streak-free finish |
| 5 | 2.28 | 0.127 | Good, easy to obtain streak-free finish |
| 6 | 3.37 | 0.123 | Reasonable, some finishing required |
| 7 | 2.83 | 0.104 | Reasonable |
| 8 | 2.03 | 0.104 | Reasonable |
| | | Set D (without dirt-capture agent): | |
| 1 | 4.82 | 0.140 | Reasonable, but hard to finish |
| 2 | 2.81 | 0.109 | Reasonable |
| 3 | 4.31 | 0.110 | Hard to finish off |
| 4 | 3.64 | 0.123 | Hard to finish off |
| 5 | 2.23 | 0.138 | Hard to finish off |
| 6 | 1.99 | 0.118 | Difficult to obtain streak-free finish |
| 7 | 2.11 | 0.127 | Severe streaks in areas |
| 8 | 2.36 | 0.087 | Light streaks remaining |

It can be seen that when the dirt-capture agent was present in the substrate, not only was the residual soil level on the glass reduced but the streak-free performance was greatly improved.

We claim:

1. An article suitable for wiping surfaces, said article comprising a flexible absorbent substrate of fibrous material treated with a cationic polymeric dirt-capture agent and carrying a liquid cleaning composition, characterised in that the substrate comprises a sheet material having a base weight of at least 50 g/$m^2$ and a thickness of at least 0.5 mm and in that the cationic polymeric dirt-capture agent is a water-soluble cationic polyacrylamide.

2. An article according to claim 1, characterised in that the cationic polymeric dirt-capture agent is a copolymer comprising at least 50 mole % of acrylamide units and up to 50 mole % of an aminoalkyl ester of acrylic or methacrylic acid which is wholly or partially quaternised.

3. An article according to claim 2, characterised in that the cationic polymeric dirt-capture agent is a copolymer comprising from 80 to 97 mole % of acrylamide units and from 3 to 20 mole % of units of said wholly or partially quaternised ester.

4. An article according to claim 2, characterised in that the cationic polymeric dirt-capture agent comprises acrylamide units and units of wholly or partially quaternised dimethylaminoethyl acrylate or diethylaminoethyl acrylate.

5. An article according to claim 2, characterised in that the cationic polymeric dirt-capture agent comprises acrylamide units and units of an aminoalkyl ester of acrylic or methacrylic acid having a degree of quaternisation of from 3 to 50 mole %.

6. An article according to claim 1, characterised in that the cationic polymeric dirt-capture agent has a molecular weight of from 5 to 20 million.

7. An article according to claim 1, characterised in that the substrate consists at least partially of natural cellulosic fibres.

8. An article according to claim 1, characterised in that the substrate is in the form of a single-layer or multiple-layer sheet and comprises a layer of bulky fibrous sheet material having a porosity of at least 80%.

9. An article according to claim 8, characterized in that said bulky fibrous sheet material includes at least some thermoplastic fibres and that at least one outer surface of said layer of bulky fibrous sheet material is partially provided with flattened areas formed by coalescing said thermoplastic fibres through the application of heat and pressure to such an extent as substantially to cause loss of their fibrous identity.

10. An article according to claim 1, characterised in that all the cationic polymeric dirt-capture agent present is so bound by the fibres of the substrate that it cannot be removed by washing.

11. An article according to claim 1, characterised in that the substrate consists of a single layer of flexible fibrous wet-strength sheet material impregnated with a liquid cleaning composition.

12. An article according to claim 1, characterised in that the substrate comprises at least two layers of flexible fibrous wet-strength sheet material laminated together and is impregnated with the liquid cleaning composition.

13. An article according to claim 1, characterised in that the substrate carries a liquid cleaning composition in controlled release form.

14. An article according to claim 13, characterised in that the substrate comprises two layers of flexible fibrous wet-strength sheet material having a layer of absorbent material positioned between them, said absorbent material being impregnated with the liquid cleaning composition.

15. An article according to claim 14, characterised in that said absorbent material is a porous polymer capable of retaining at least 5 ml of liquid per g polymer against gravity and of releasing said liquid on the application of hand pressure.

16. An article according to claim 15, characterised in that the porous polymer is a styrene homo- or copolymer or a chemically modified styrene homo- or copolymer.

17. An article according to claim 16, characterised in that the porous polymer is a sulphonated polystyrene.

18. An article according to claim 1, characterised in that the liquid cleaning composition is a homogeneous aqueous solution having a surface tension of less than 45 $mNm^{-1}$ which when applied to a surrface and allowed to dry, dries substantially without forming discrete droplets or particles larger than 0.25 $\mu m$.

19. An article according to claim 18, characterised in that the liquid cleaning composition contains water, a nonionic surfactant in an amount not exceeding 1.5% by weight, and optionally a lower aliphatic alcohol selected from ethanol and isopropanol.

20. A process for the production of an article according to claim 1, characterised in that:

(i) the substrate is treated with a solution of a cationic polyacrylamide;

(ii) the substrate is dried;

(iii) the substrate is impregnated with the liquid cleaning composition.

21. A process for the production of an article according to claim 20, characterized in that subsequent to step (ii) but before step (iii), the substrate is washed with water or with the liquid cleaning composition to remove any of said cationic polyacrylamide not bound to the fibres of the substrate.

* * * * *